Jan. 17, 1939. W. E. KLAUER 2,144,311
SNOW REMOVING MECHANISM
Filed Aug. 12, 1936 14 Sheets-Sheet 6

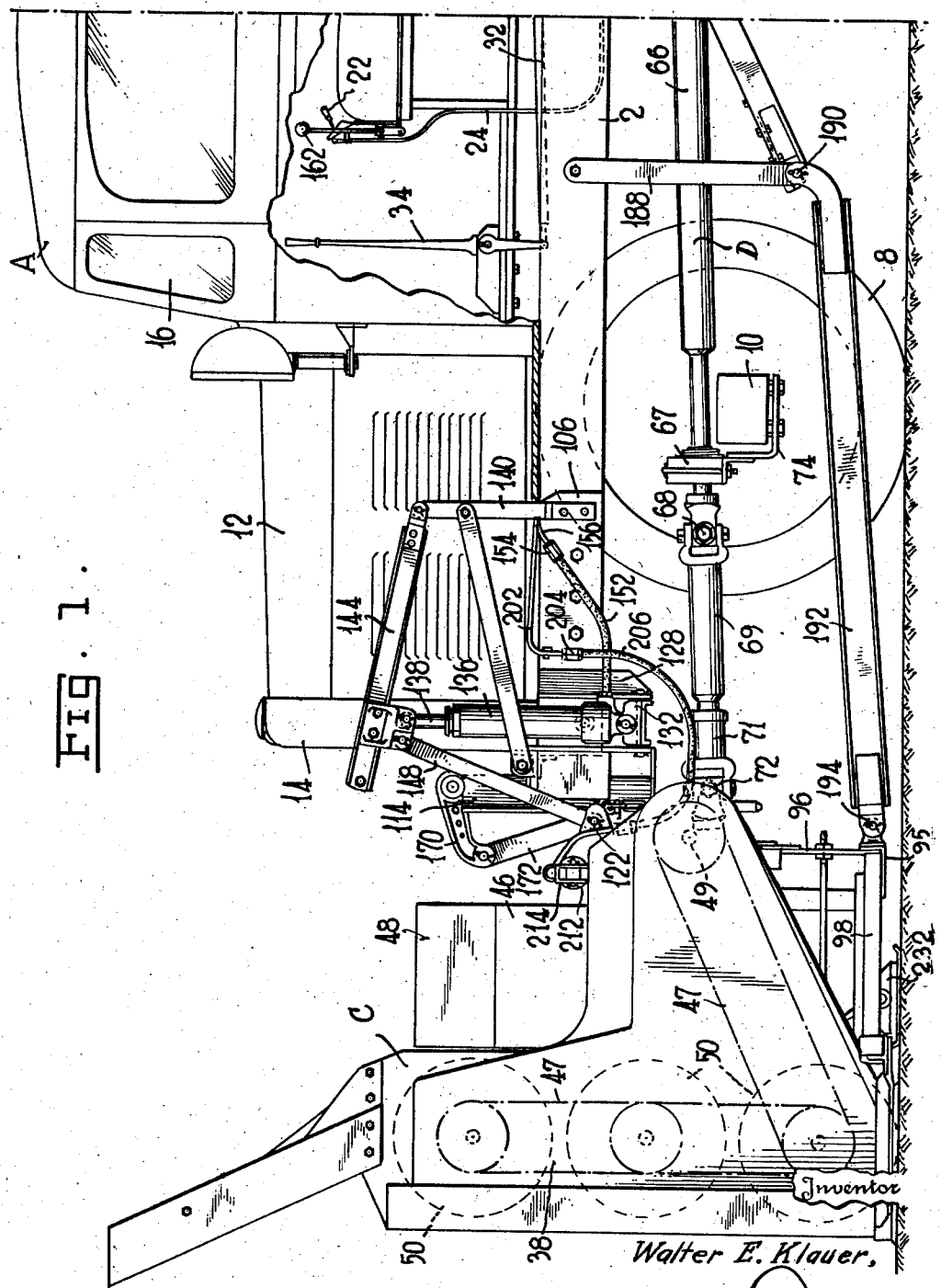

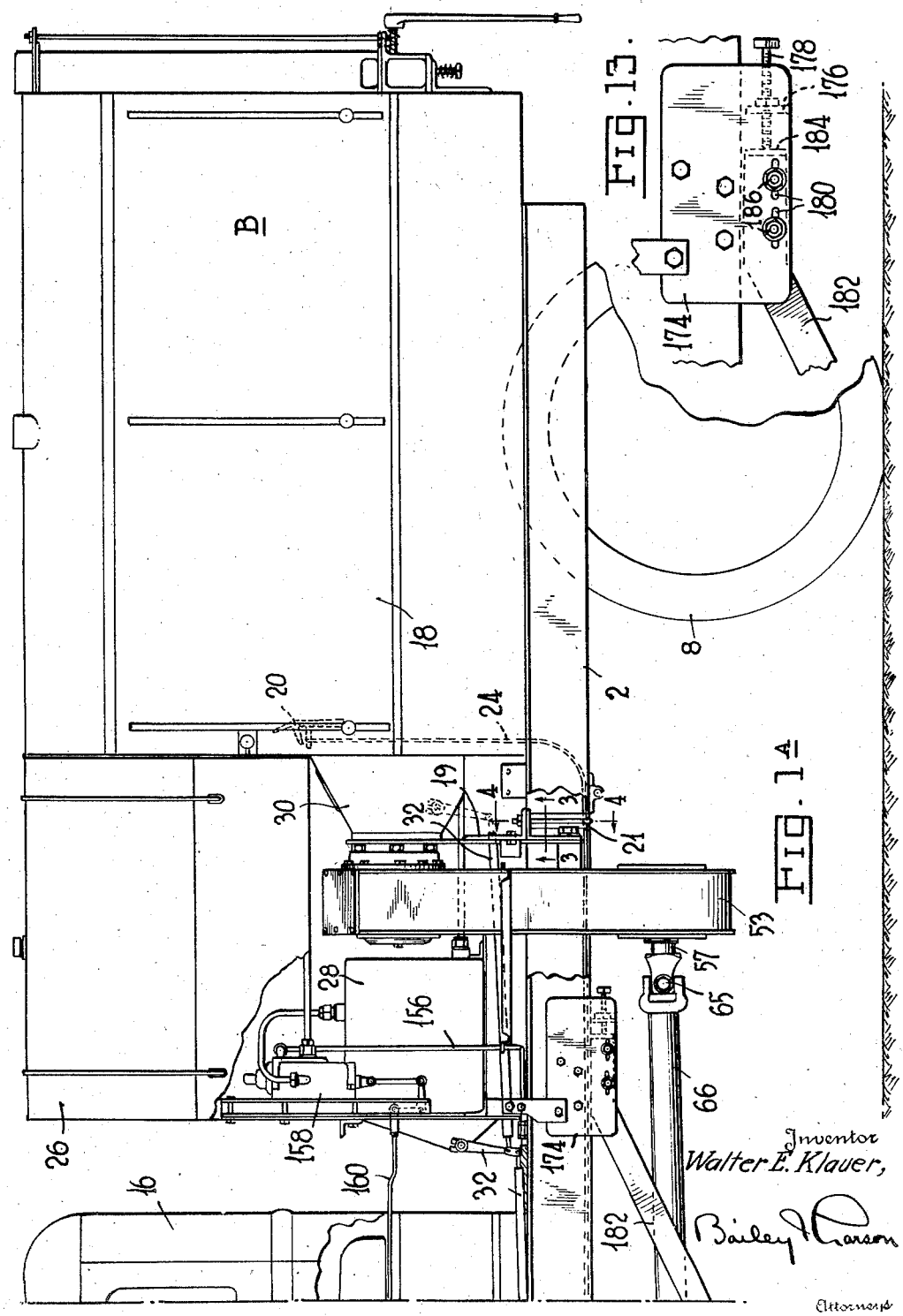

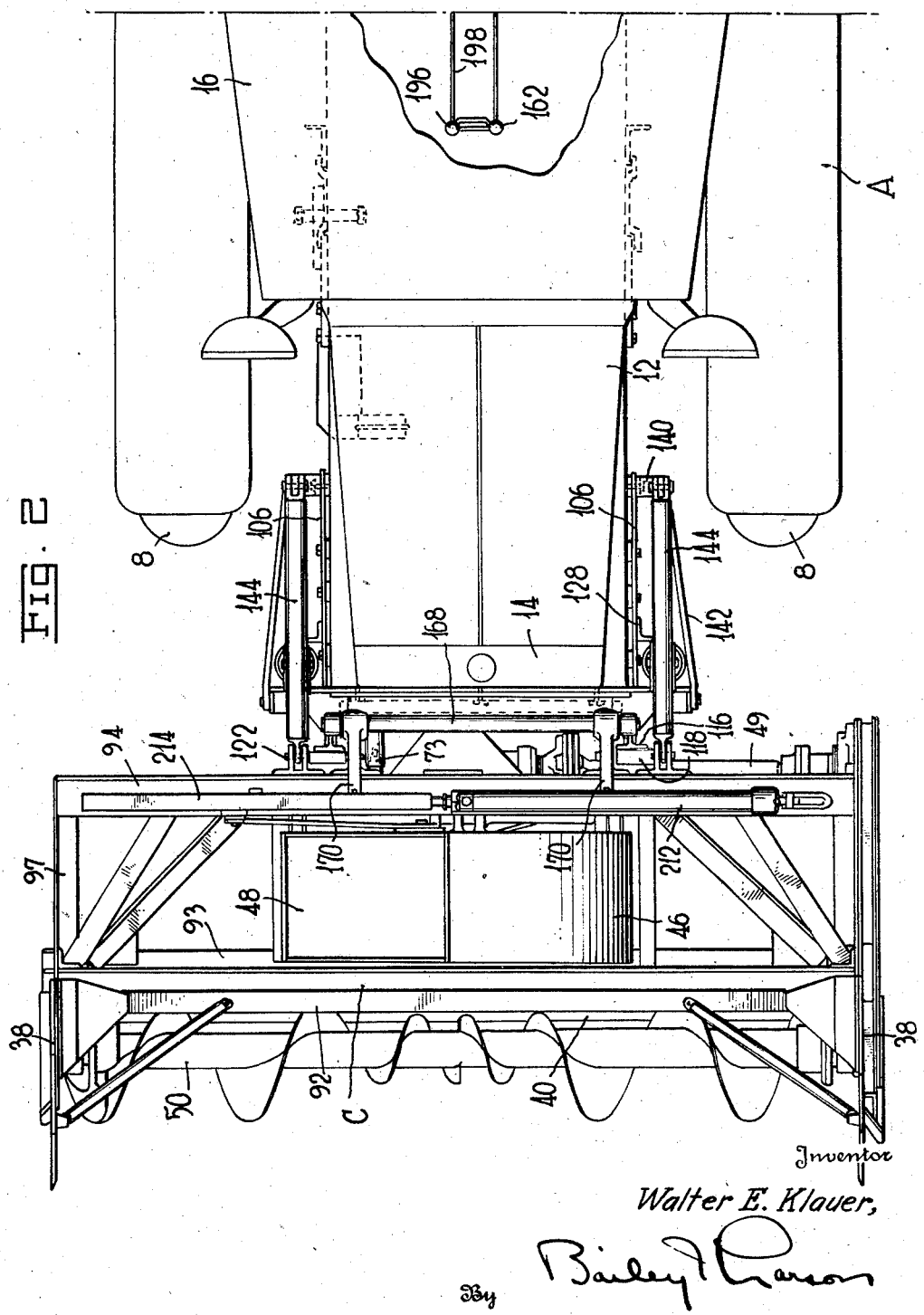

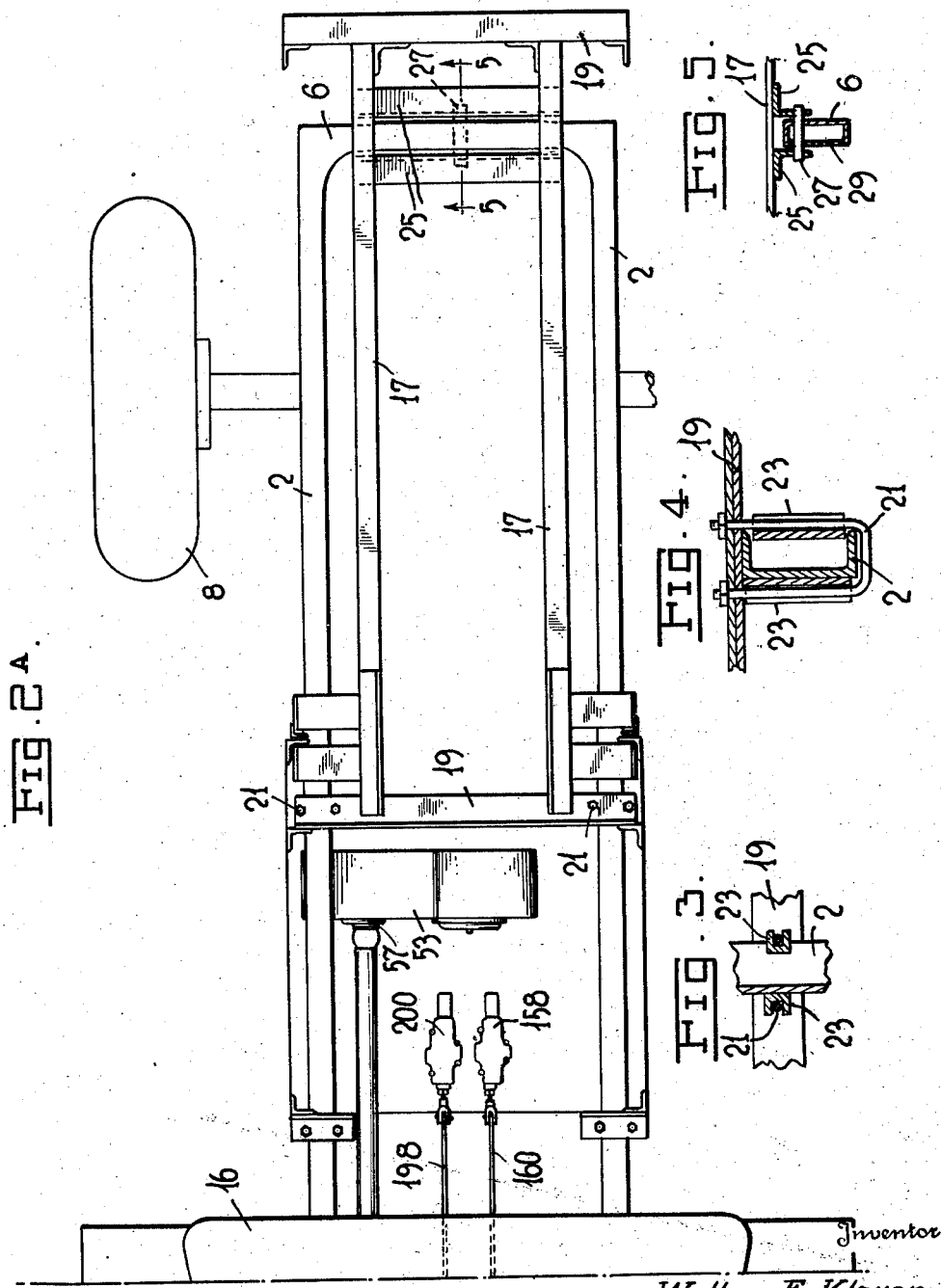

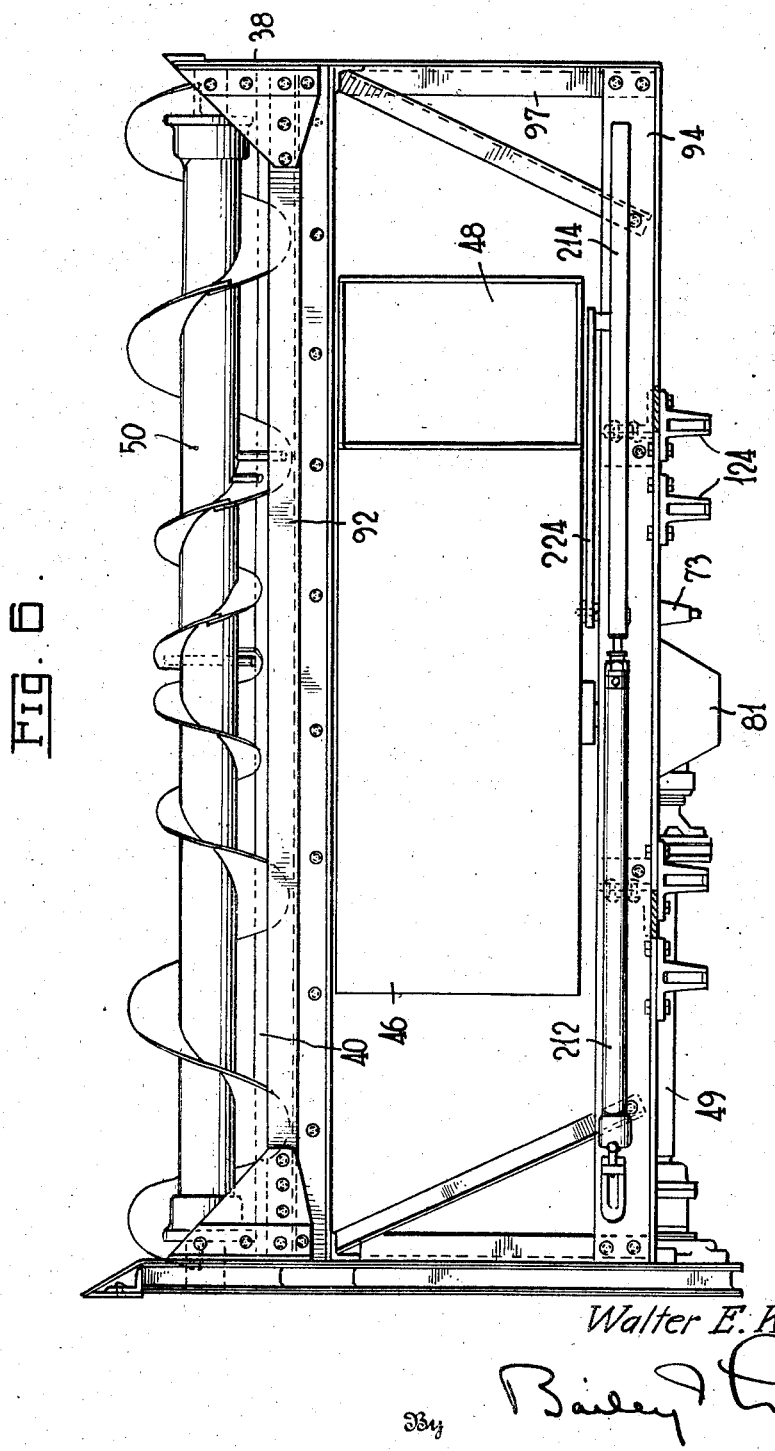

Inventor
Walter E. Klauer,
By Bailey Crawson
Attorneys

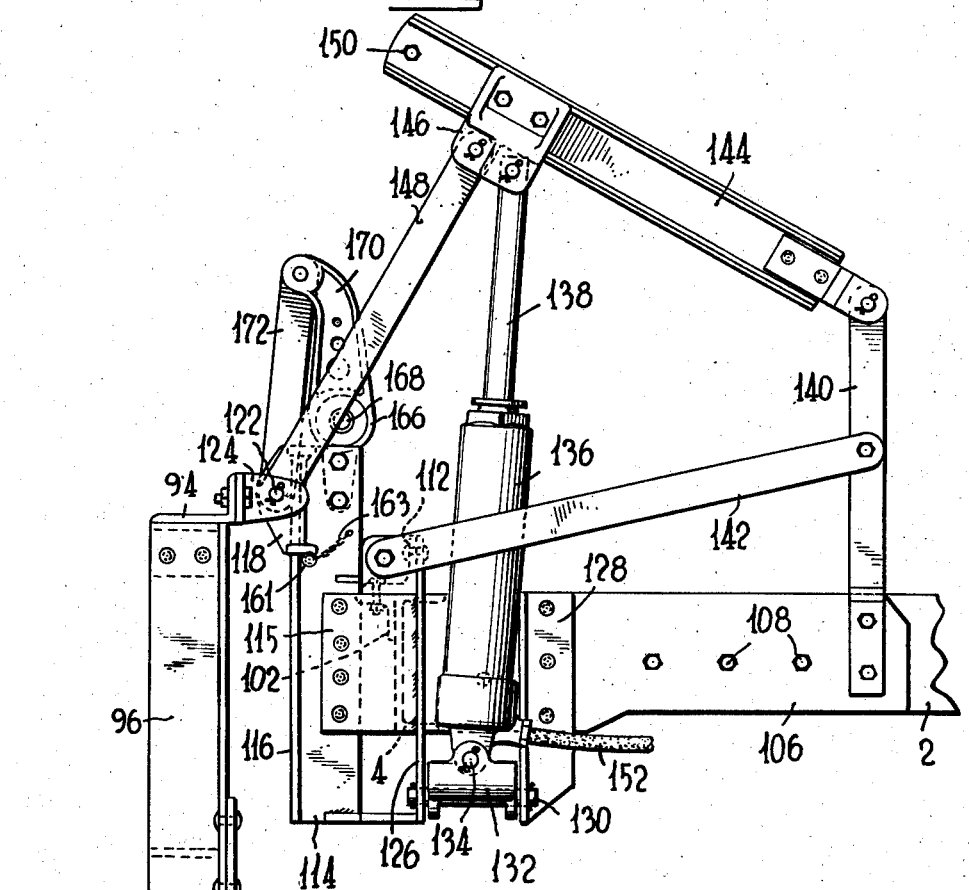
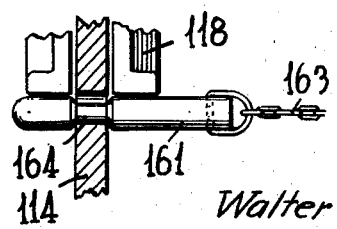

Jan. 17, 1939.　　　　W. E. KLAUER　　　　2,144,311
SNOW REMOVING MECHANISM
Filed Aug. 12, 1936　　　14 Sheets—Sheet 8
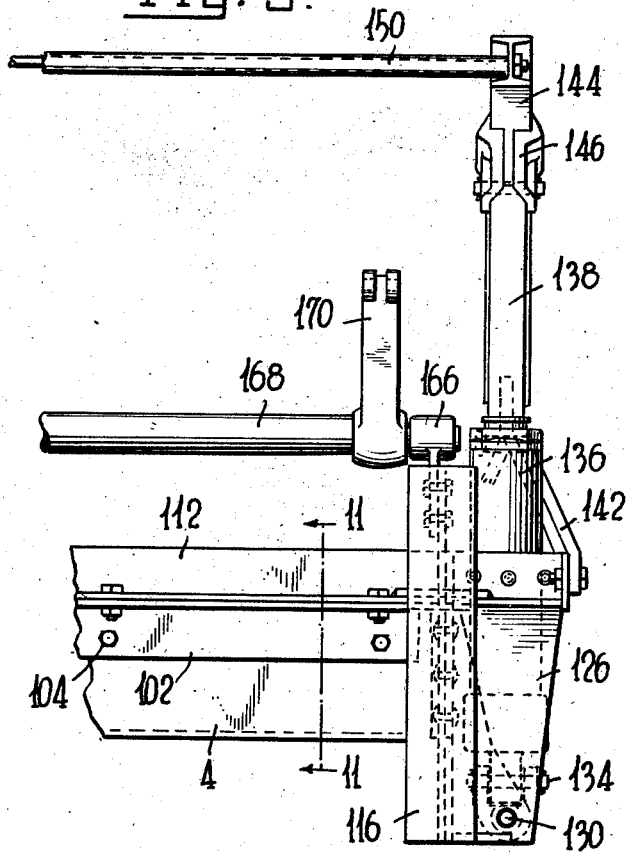
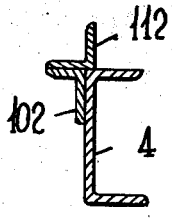
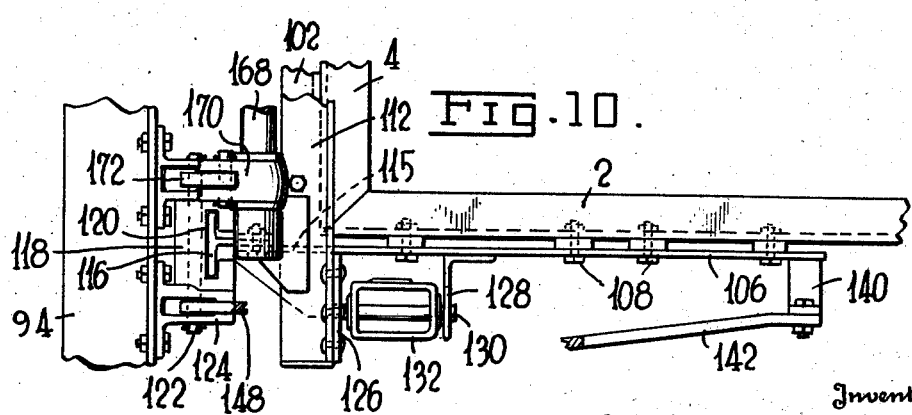
Inventor
Walter E. Klauer,
By
Attorneys Jan. 17, 1939. W. E. KLAUER 2,144,311
SNOW REMOVING MECHANISM
Filed Aug. 12, 1936 14 Sheets-Sheet 9
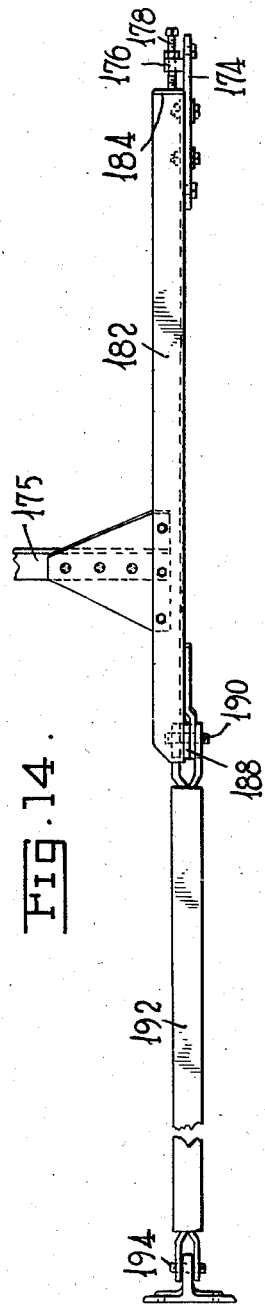
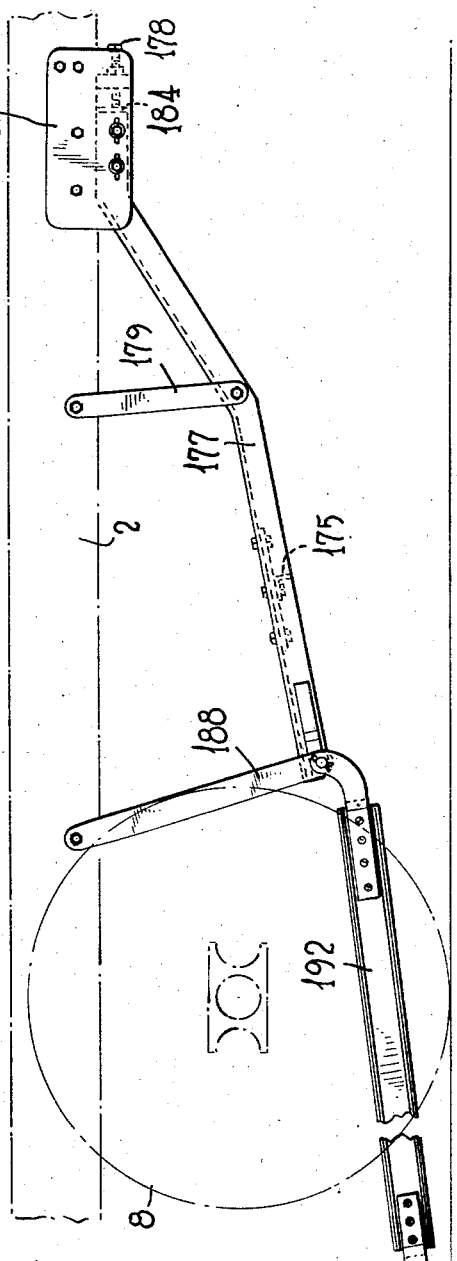
Inventor
Walter E. Klauer,
By Bailey Crawson
Attorneys

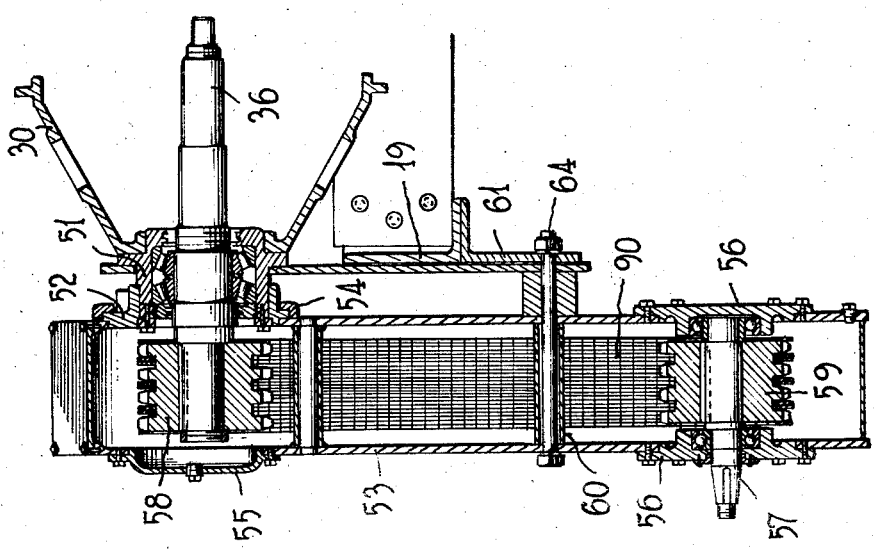
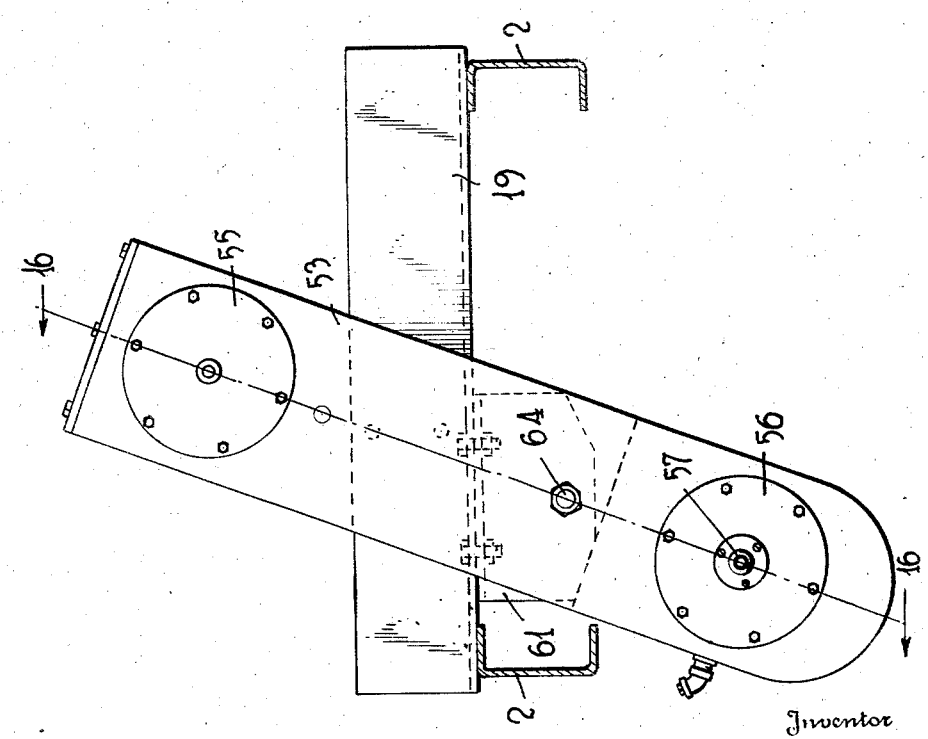

Jan. 17, 1939.  W. E. KLAUER  2,144,311
SNOW REMOVING MECHANISM
Filed Aug. 12, 1936   14 Sheets-Sheet 11

Inventor
Walter E. Klauer,
By Bailey & Carson
Attorneys

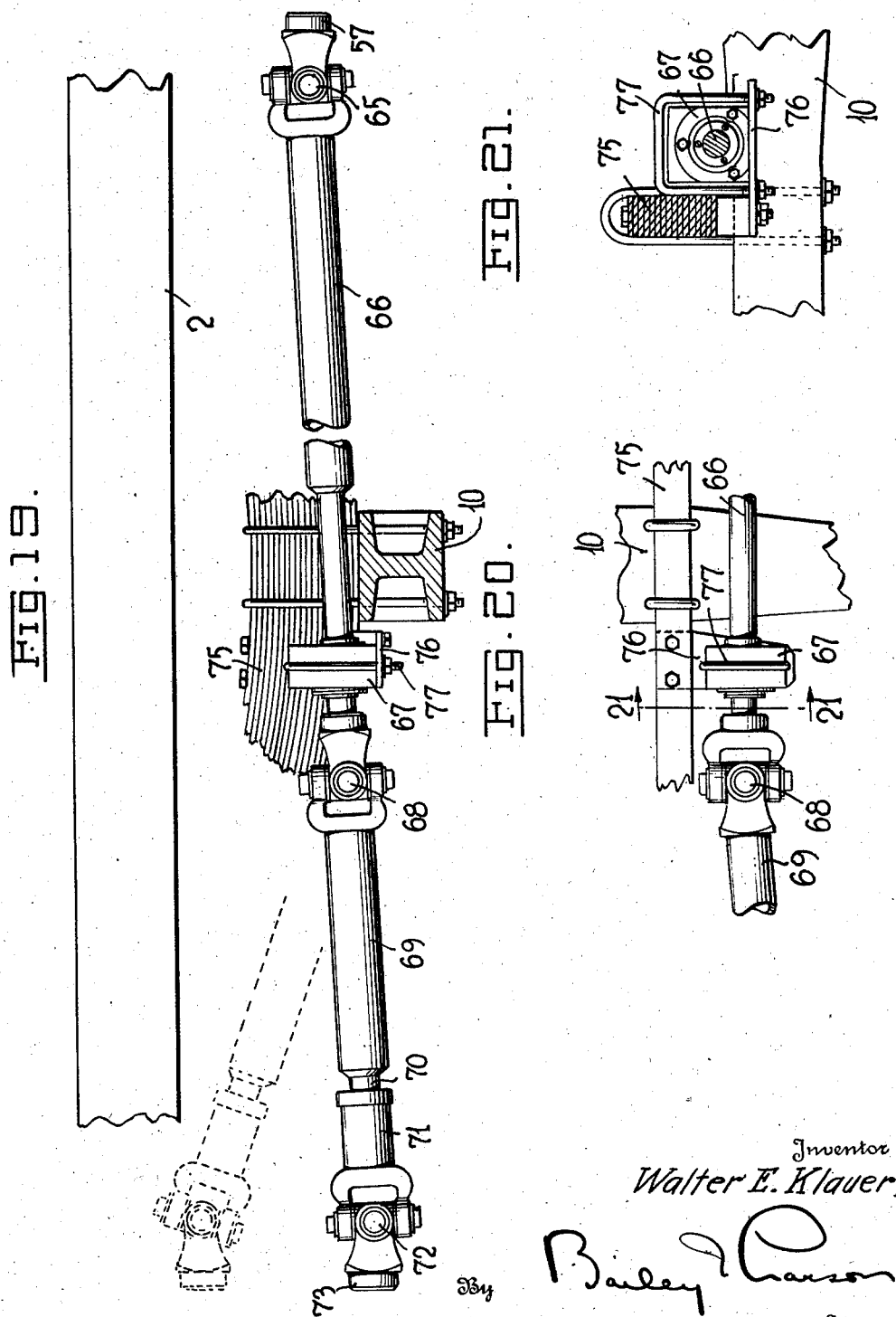

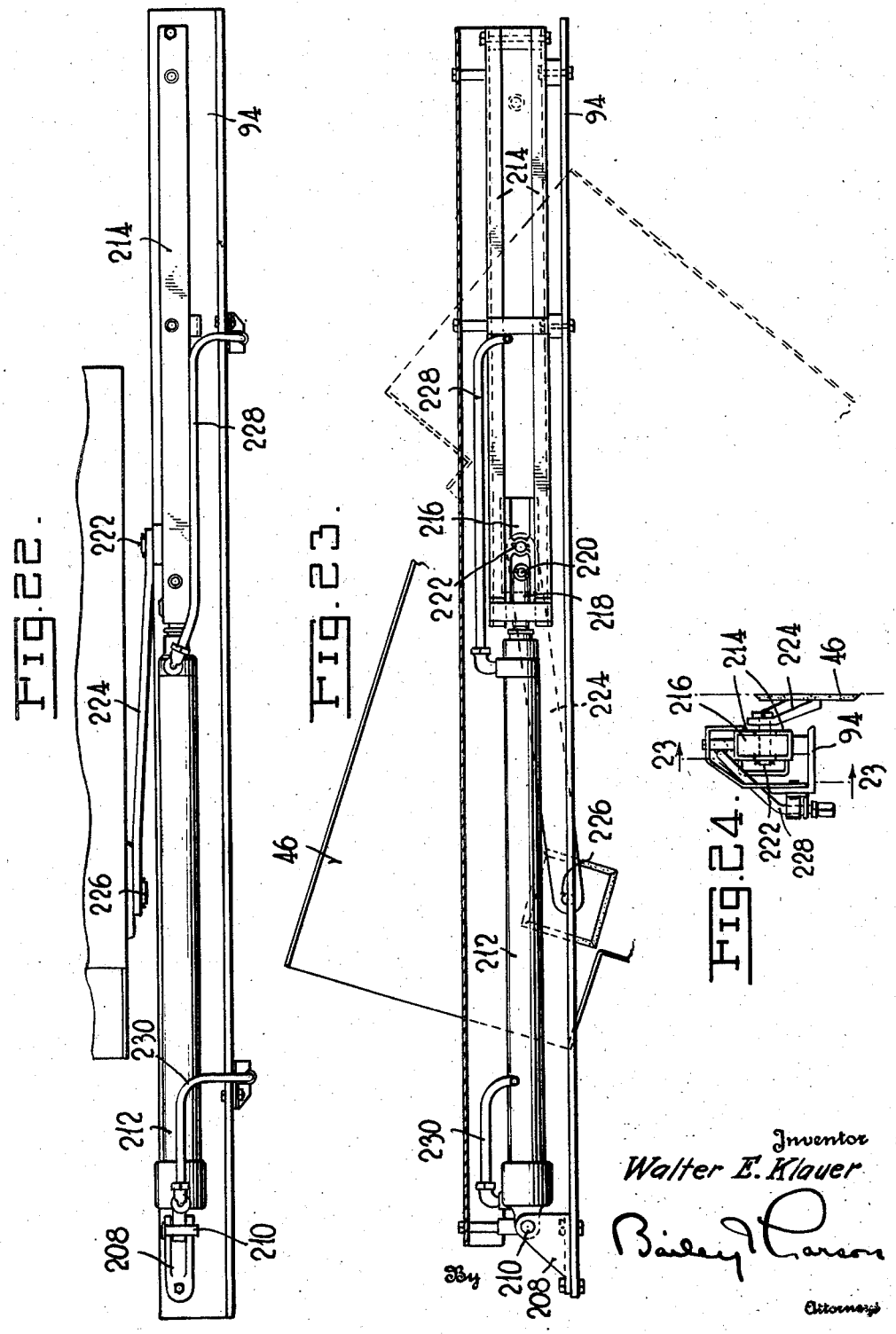

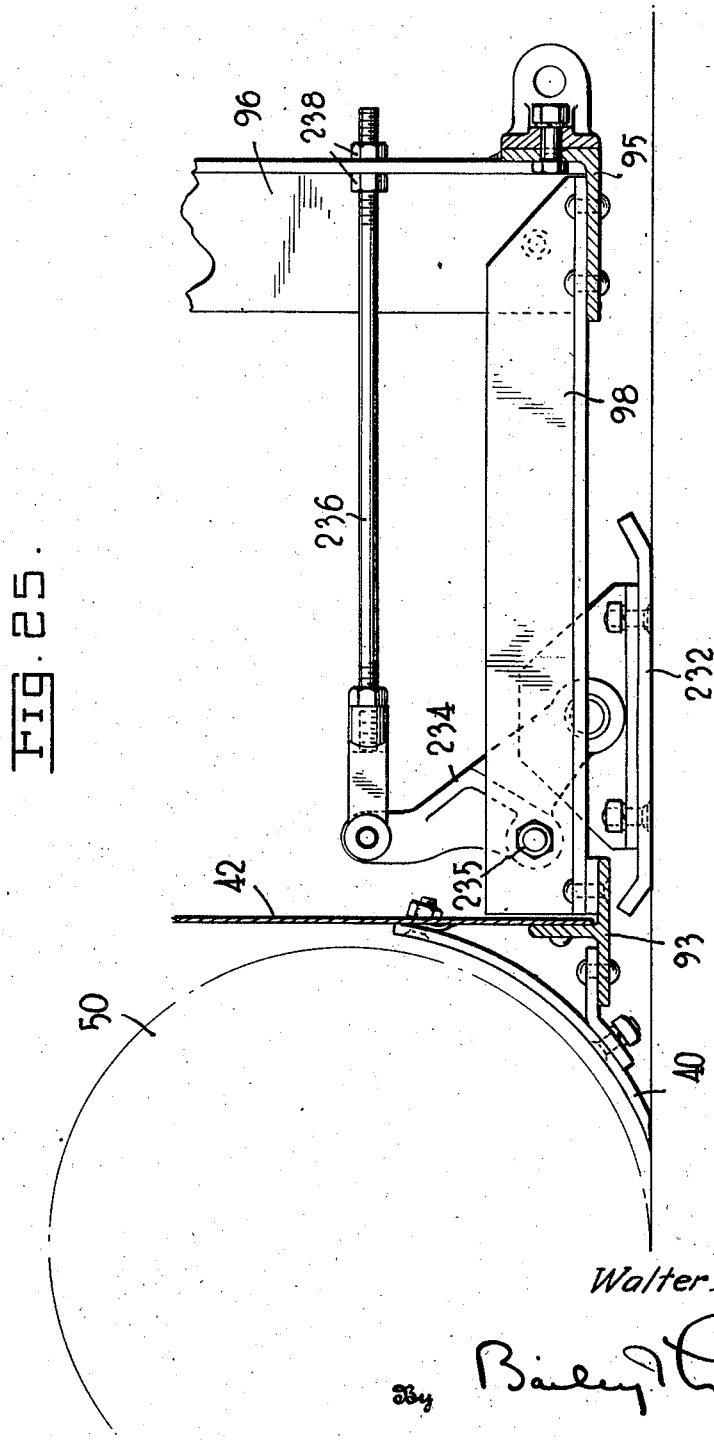

Patented Jan. 17, 1939

2,144,311

UNITED STATES PATENT OFFICE 2,144,311

SNOW REMOVING MECHANISM

Walter E. Klauer, Dubuque, Iowa

Application August 12, 1936, Serial No. 95,688

20 Claims. (Cl. 37—43)

The present invention relates to snow removing mechanism and particularly to such mechanism adapted for use in removing snow from streets and highways. It is concerned more particularly with such mechanism which is carried by a motor truck.

In the past, the usual practice in the production of snow removing mechanism has been to mount the same permanently on a special truck. Such an arrangement is compartively expensive, and its expense is increased because it can be used only during a short period of the year. The advantage of the use of trucks as compared to tractors is that such devices can move easily from one place to another as required at a high rate of speed, which is almost a necessity.

The primary object of the present invention is to provide power driven snow removal mechanism of a practical and efficient type which is arranged so that it can be readily mounted on and removed from a truck. Both the snow remover and the power unit for driving the same are easily and readily demountable. In this manner, the mechanism may be applied to a standard truck, which is used during the snow season to carry the snow removing mechanism, and may be used during the remainder of the year for hauling purposes as a freight vehicle.

One of the special features by which this result is accomplished resides in a special frame which acts as a carrier for the snow remover and its lifting mechanism, and which is mountable as a unit on the front of a truck in such a manner that it rests on one of the truck chassis members and is supported directly thereby.

Some attempts in mounting snow removers on trucks have heretofore been made, but have not been practical. It has generally been necessary to drive the snow remover from the power unit through a drive shaft running above or at the side of the truck. Obviously this is a serious disadvantage as it interferes with the regular truck structure, either passing through the cab or blocking the doors, or else increases the height of the truck. In addition, such drives require constant changes in the direction of drive, which makes the drive complicated and reduces its efficiency because of increased friction. The power required for driving the snow remover is thus increased. Furthermore, driving shafts so located are exposed to damage through contact with snow banks, fences, overhanging tree limbs and the like.

It is therefore another object of the present invention to provide an arrangement in which the snow remover is driven by a power unit located at the back of the plow through a drive shaft or drive train which runs in a substantially straight line underneath the body and chassis of the truck and requires only one change of direction. More particularly, my purpose is to provide a drive train such that this result can be accomplished when the plow is applied to different types of standard trucks. In this manner no special truck is required and the mechanism can be carried by trucks already in use.

In connection with this feature of the invention, it is important that the drive shaft be properly mounted so that it will not be damaged when the truck strikes obstructions and moves up and down on its springs. For that purpose, I provide a novel type of drive shaft and a bearing for an intermediate portion of the shaft so mounted as to be unaffected by the movement of the truck, and carried either by the springs themselves or by the front axle which is mounted on the springs.

In connection with the same feature a special arrangement is provided so that it is possible to vary the line of the drive shaft under the truck, by varying the angular position of a suitable driving device between the power unit and the shaft.

It is quite usual to have a snow remover mounted on the front of a vehicle in such a manner that it can be lifted or lowered either to pass over obstructions or to move at a given distance above the surface of the ground or road. In the past, however, and particularly with the rotary type of plow, to which my invention especially relates, the snow remover has been mounted in such a manner that it turns about an axis or pivot in its rising and falling movement. Such an arrangement tilts the snow remover either forward or backward, and throws it far out of line so that it does not act in its proper and intended manner. A further object of the present invention therefore is to provide a mounting for a snow remover on a vehicle such that it is capable of a subsantially straight up and down movement without tilting. More especially I provide a specific mounting for giving this result. This mounting both acts as a guide to keep the snow remover in vertical position, as a carrying mechanism for the snow remover, and also as a thrust resisting mechanism for imparting the force exerted on the plow by the resistance of the snow to the chassis of the vehicle.

Furthermore, the lifting mechanism for raising and lowering the snow remover is generally of a heavy and complicated nature. An object of the invention is to provide a simple lifting mechanism which is relatively light in weight and which is yet strong and effective. Also, the lifting arrangmenet is so designed as to avoid blocking the radiator of the truck. One of the principal features by which this result is accomplished resides in the fact that most of the parts of the lifting mechanism are under tension, and can thus be made in a simplified and considerably lightened form. Another important part of the invention is the arrangement of the lifting devices at opposite sides of the vehicle.

Furthermore, in vertically movable snow removers heretofore known there has been a considerable disadvantage in that the means for raising the two sides of the mechanism often do not work together and in synchronism. One side of such a device may rise as much as eight inches before the other side rises at all. Of course this often defeats the whole purpose of raising the snow remover, since instead of giving a level cut at a given height, a sloping cut is obtained. Furthermore, it causes considerable strain on the parts and thus reduces the life of the device.

Another object of the invention then is to provide an arrangement which will absolutely prevent one side of the snow remover from rising faster than the other, but will equalize at all times the motion of the two sides so that the snow remover is kept absolutely parallel to the road surface.

A further feature of the invention resides in an arrangement by which a rotary type of snow remover may be separated easily and quickly from the remainder of the device, and a plow of another type substituted therefor in such a manner that the second plow can be raised and lowered by the same arrangement which supports the rotary snow remover. More especially, I provide a device in which the removal of four pins is all that is necessary to take off the rotary plow and replace it by a push plow or other construction.

Still another object of the invention resides in the provision of a novel thrust bar for resisting rearward movement of the lower end of a snow remover, this bar comprising members under tension and under compression so that a light and simple structure of considerable strength is provided.

Another difficulty particularly relating to snow removers of the rotary type which have a rotating or shiftable spout through which snow is ejected, movable so that snow will be thrown to one side or to the other of the snow remover, resides in the control of the position of such a spout. I have found that such control, which has hitherto been mechanical, is much simplified and easier if a hydraulic arrangement controlled from the cab of the truck is used for accomplishing this purpose.

Still another feature of the invention resides in a special arrangement for supporting the snow remover raised slightly above the level of the ground or road, so that when it is desired to run for some distance with the plow slightly raised this can be done without keeping a constant pressure on the hydraulic lifting mechanism.

Still another feature of the invention resides in the provision of a novel type of auger for snow removers, which is more efficient in handling snow than those heretofore in use and which is distinguished by the fact that the end portions of the auger are of greater diameter than the central portion thereof.

Further objects and advantages of the invention will appear more fully from the following description, particularly when taken in conjunction with the accompanying drawings which form a part thereof.

In the drawings:

Fig. 1 is a side elevation of a snow remover embodying my invention and shown as mounted on a truck.

Fig. 1a is a continuation of Fig. 1, showing the power unit on a truck.

Fig. 2 is a top plan view of the arrangement shown in Fig. 1.

Fig. 2a is a continuation of Fig. 2 showing in top plan view the arrangement of Fig. 1a, with the power unit removed.

Figs. 3 and 4 are detail cross sections substantially on the lines 3—3 and 4—4 of Fig. 1a.

Fig. 5 is a cross section on the line 5—5 of Fig. 2a.

Fig. 6 is a top plan view showing the snow remover frame.

Figure 7:
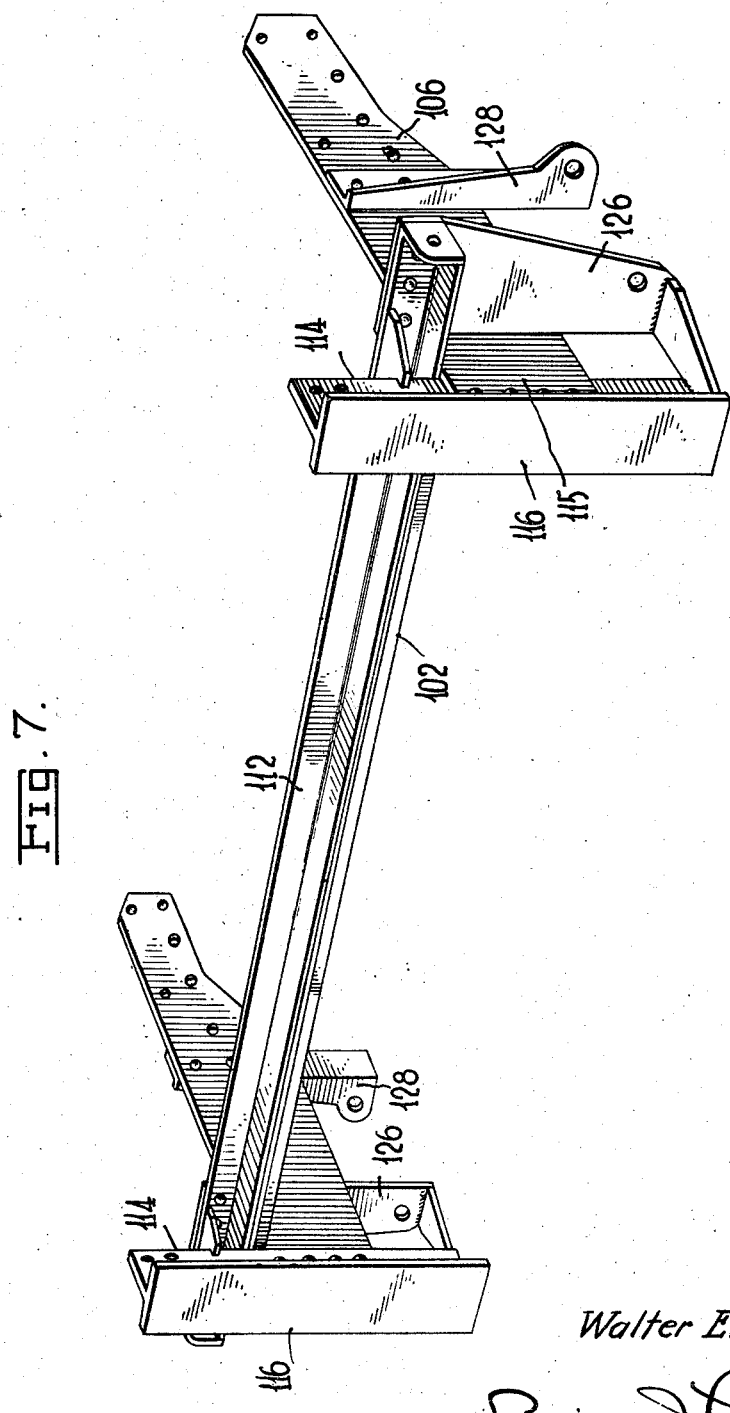

Fig. 7 is a perspective view of the unitary frame.

Fig. 8 is a detail side elevation showing the lifting, guiding and equalizing mechanism.

Fig. 9 is a front view of one side of this mechanism with the snow remover disconnected.

Fig. 10 is a top plan view of one side of the mechanism shown in Fig. 8 with parts broken away.

Fig. 11 is a cross section on the line 11—11 of Fig. 9.

Fig. 12 is a detail view of the arrangement for holding the snow remover in raised position.

Fig. 13 is a detail showing of the rear end of the push bar support.

Fig. 14 is a top plan view of the thrust bar arrangement.

Fig. 15 shows in front elevation one form of drive mechanism for permitting lateral adjustment of the drive shaft.

Fig. 16 is a cross section on the line 16—16 of Fig. 15.

Figure 17:
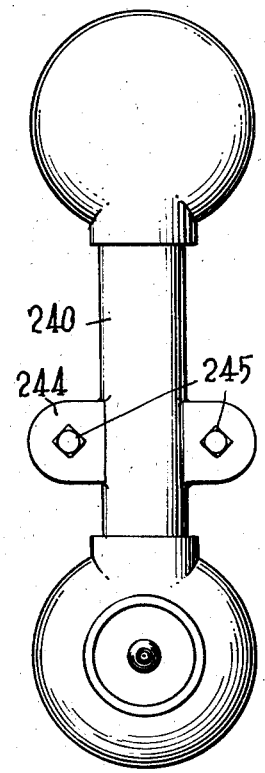

Fig. 17 shows in transverse section a modified form of drive.

Figure 18:
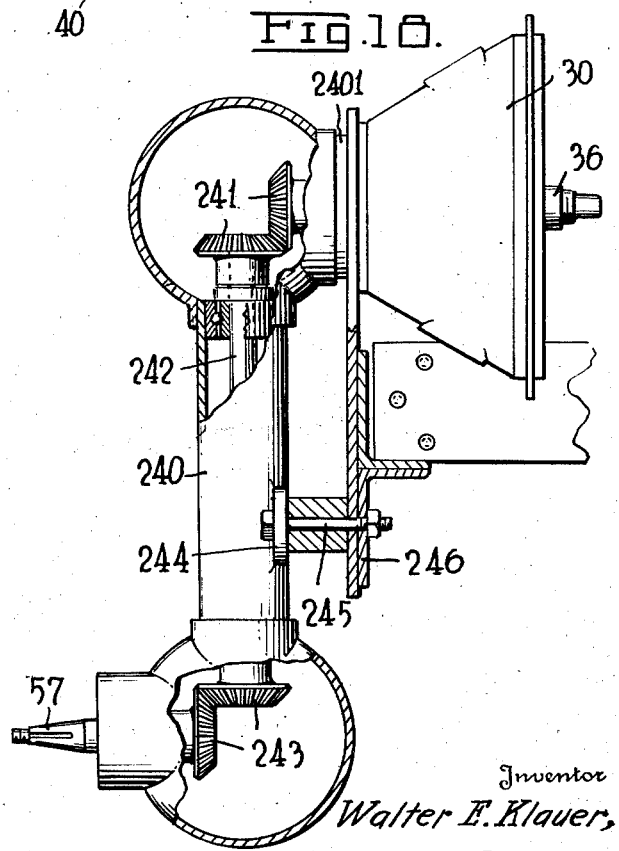

Fig. 18 is a side view of the same with parts broken away.

Fig. 19 is a side elevation showing the drive shaft, with an intermediate bearing mounted somewhat differently from that shown in Fig. 1.

Fig. 20 is a top plan view of a portion of Fig. 19.

Fig. 21 is a cross section on the line 21—21 of Fig. 20.

Fig. 22 is a top plan view of the hydraulic spout control.

Fig. 23 is a cross section on the line 23—23 of Fig. 24.

Fig. 24 is an end view of the mechanism of Fig. 22.

Fig. 25 is a detail view of one of the adjustable shoes.

Figure 26:
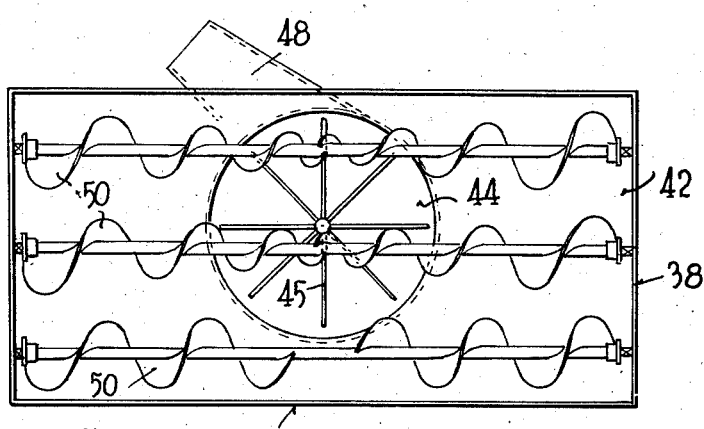

Fig. 26 is a front elevation of the snow remover.

Fig. 27 shows in side elevation a modified form of push bar.

As shown in Fig. 1, the snow remover is mounted on a truck A of any standard type. This truck has a chassis consisting of longitudinal members 2, a front cross member 4 and a rear cross member 6. The chassis is mounted on wheels 8, supported by axles such as the front axle 10. The wheels, preferably the rear wheels, are driven by a motor mounted in the hood 12 and provided with a radiator 14. The truck also has a cab 16 of any suitable type.

Mounted on the rear end of the truck is the power unit B. The power unit is carried by a sub-frame. This sub-frame comprises longitudinal members 17 and cross members 19. The front cross member rests on the longitudinal chassis members 2, and is secured thereto by U bolts 21 which lie in grooves provided in channel spacer members 23 which prevent the bolts from causing collapse of the chassis frame members (Figs. 3 and 4). Near the rear of the sub-frame are arranged transverse angle irons 25 having portions extending downwardly on opposite sides of the rear chassis frame member 6. A removable pin 27 passes through these angle irons and through the vertical wall of the member 6. The holes for the pin are so located that the longitudinal members 17 are spaced above the member 6 by a slight distance, say one inch. The channel member 6 may be braced at its open side by a small plate 29.

This arrangement gives a three point mounting for the sub-frame and power unit, but other suitable types of mounting may obviously be employed. It is desirable, however, that some arrangement which is readily removable from the truck be used.

The power unit consists of a motor or engine 18 controlled by a throttle 20 which may be operated by a lever 22 inside the cab 16 through a flexible or Bowden cable 24. The unit B also includes a gasoline tank 26 for supplying fuel to the engine and a suitable pump for forcing a liquid such as oil under pressure into a supply tank 28. The motor drives a clutch which is mounted in a housing 30 and is controlled through a link and lever system 32 by a lever 34 in the cab of the truck. The clutch is adapted to couple and uncouple a shaft 36 to and from the motor 18.

C indicates in general the snow remover. It consists in the preferred form of a casing having side walls 38, a bottom wall and scraper blade 40 and a rear wall 42. An opening 44 in the rear wall 42 communicates with the interior of a fan casing 46 in which is mounted a fan 45 for ejecting snow through the spout 48. Within the casing formed by walls 38, 40 and 42 are mounted three augers or conveyers 50 on horizontal vertically spaced axes. These augers are all driven by a suitable chain drive mechanism 47 from a sprocket mounted on a shaft 49, to feed snow towards the center of the casing so that it can pass through the opening 44 into the fan casing 46.

The snow removing mechanism is driven through a shaft mechanism D running underneath the truck, shown in Figs. 19 to 21. It is desirable to be able to vary the position of the back end of this driving shaft, so that its angular relation to the body of the truck may be changed. In this manner it is possible to avoid obstructions extending below the truck, and thus to apply the snow removing mechanism to trucks of varying types.

In order to be able to vary the position of the rear end of the drive shaft while driving it in all positions from the power unit B, which is relatively fixed on the truck, the arrangement shown in Figs. 15 and 16 is provided.

The shaft 36 driven by the clutch extends forwardly of the clutch casing 30. On the end of the clutch casing is mounted a sleeve 51 upon which is rotatably arranged an annular member 52. The width of this annular member varies so that it acts as an eccentric. The edge of member 52 fits between a portion of the wall of casing 53, within an opening in which the member 52 is arranged, and a clamping ring 54 suitably secured to the casing 53. In this manner, the casing is capable of turning with respect to the clutch housing 30 and sleeve 51. By turning the eccentric member 52 the position of the casing relative to the shaft 36 may be varied to a certain extent, the purpose of this construction being to permit tightening of the chain as will be evident from the description which is to follow. Opposite the member 52 is another opening in the casing which is closed by a suitable plate 55. The whole casing 53 is oil-tight, so that the mechanism may run in oil, and is preferably formed of welded steel.

At its lower end the casing 53 has opposed openings closed by closure plates 56 in which is mounted by suitable bearings a stub shaft 57. Pinions 58 and 59 on the shafts 36 and 57 respectively are connected in driving relation by an endless chain 90. The front and rear walls of the casing are held in spaced relation by spacer elements 60.

It is evident that with this construction the position of the shaft 57 may be adjusted transversely of the truck, while at the same time this shaft is always driven by the power unit when the clutch is engaged. In other words, the shaft 57 may be fixed in various adjusted positions, and when so fixed will continue to drive the snow remover. In order to hold the casing in its adjusted positions, a plate 61 or angle iron is arranged extending downwardly from the transverse member 19 of the sub-frame of the power unit. This plate is provided with an opening. A bolt 64 passes through one of the spacing members 60 and through the opening. It is obvious that by means of this bolt the casing 53 may be held in a given angular position.

By utilizing plates having differently positioned holes, it is a very simple matter to adjust the snow remover to different makes and models of trucks, without requiring any special parts other than a single simple element. Thus the whole unit can be made up and used on different vehicles simply by having one plate for each vehicle.

A modified form of drive is shown in Figs. 17 and 18. The clutch driven shaft 36 and the shaft 57 are here connected by gears and an auxiliary shaft casing 240 is mounted by extension 240' to turn about the axis of shaft 36. The lower end of this casing supports shaft 57, which is driven from shaft 36 through bevel gears 241, auxiliary shaft 242, and bevel gears 243.

Ears 244 carried by casing 240 are arranged to receive bolts 245 which pass through plates 246, secured to the sub-frame of the power unit. By changing the plates 246 the position of shaft 57 may be suitably varied.

In either form, there is really only one change of direction in the transmission of the power, and the driving force is transmitted from above to below the chassis frame in a very simple manner.

Shaft 57 carries a universal joint 65 which drives a shaft section 66. Section 66 is mounted in a flexible or self-aligning bearing 67 (Figs. 19 to 21) which allows variation of the angular position of the shaft with respect to the bearing. In front of the bearing 67 is arranged a universal joint 68 which drives another shaft section 69. The front end 70 of shaft 69 is reduced in cross section and fits into a coupling member 71 in keyed relation thereto. The members 70 and 71 are slidable endwise with respect to each other. Member 71 is connected by a universal joint 72 to a shaft 73 which is fixed in the snow remover and drives the rotary augers and the fan thereof.

Two possible mountings are disclosed for the intermediate bearing 67. In the form shown in Fig. 1, the bearing 67 is mounted through angle members 74 on the front axle 10 of the vehicle.

In the forms shown in Figs. 19 to 21, the front axle 10 is supported by springs 75. Secured to one of the springs is a plate 76 which supports through a U-shaped bolt 77 the bearing 67. In this manner the bearing is also arranged so that it moves substantially with the front axle of the truck.

This mounting and drive mechanism are of great advantage. One problem resides in the fact that the snow remover is capable of being moved up and down on the truck, so that flexibility in the shaft is essential. However, if the shaft is too long it will whip or break. The mounting of the intermediate bearing to move with the front axle or springs provides a simple and convenient manner of supporting the central portion of the shaft while at the same time permitting movement between the axle and chassis without damage to the shaft. The rear universal then takes care of the movement of the axle with respect to the body, while the front universal permits vertical movement of the snow remover.

Shaft 73 through suitable gearing in box 81 drives fan 45 and shaft 49.

The mounting of the snow remover on the truck will now be described.

The snow remover is carried by a frame having transverse front top and bottom members 92 and 93, transverse rear top and bottom members 94 and 95, top side members 97, vertical members 96, and horizontal bottom members 98 which support the ends of scraper 40 forming the bottom portion of the wall of the auger casing.

I provide a unitary frame which may be easily applied to and removed from a truck for carrying the snow remover and the mechanism for manipulating the same. This frame is shown in Figs. 7 to 11.

The supporting and guiding unitary frame for the plow includes a front cross member 102 adapted to be secured by bolts 104 to the front cross piece 4 of the chassis and side plates 106 adapted to be secured by bolts 108 to the side frame members 2 of the chassis. The cross member 102 has secured thereto and above it another cross member 112 which extends out beyond the sides of the chassis frame. It will be noted (Fig. 11) that member 112 also extends rearwardly slightly beyond member 102, and that this extension rests on the top of front chassis member 4. In this fashion the chassis member supports the weight of the snow remover directly and the whole load thereof is not carried by the bolts.

Both the members 102 and 112 are angle irons. The side members 106 extend forwardly of the chassis frame and of the cross member 102 and at their forward ends support vertically arranged T-shaped rails having leg portions 114, bolted to the extensions 115 of the side plates, and cross portions or arms 116. Plates 126 are secured to and extend downwardly from the ends of the cross member 112, and angle members 128 are secured to the side pieces 106. The parts of this frame are preferably both riveted and welded together, so that the whole frame acts as a unit which may be secured bodily to the truck and will serve as the connection between the snow remover and the vehicle.

Guide blocks or slide members 118 are provided with T-shaped slots 120 which fit over the arms of the T rails and thus the blocks 118 are guided thereby for vertical sliding movement. Pins 122 pass through the blocks 118 and through the arms or brackets 124 secured on the cross member 94 of the plow frame, one of these brackets being arranged on each side of each block 118. Thus the plow frame is guided at both sides for straight up and down movement.

For raising and lowering the plow a special hydraulic arrangement is provided. Through the pairs of parallel plates 126 and 128 are inserted pins 130 on which are pivotally mounted blocks 132 supporting transverse pins 134. The pins 134 provide pivots for hydraulic cylinders 136, one on each side of the snow remover, in which are slidably arranged pistons 138.

Secured to the frame side members 106 at points to the rear of the front cross chassis member are uprights 140, which are braced by links 142 connected at one end to the uprights and at the other end to the ends of the transverse member 112. Pivoted to the upper end of the uprights are beams or links 144, preferably I beams. These beams carry blocks 146 to which are pivoted the pistons 138 and links 148 which at their other ends are traversed by the pins 122 in the neighborhood of the outer brackets 124.

Of course one of these lifting devices is provided on each side of the plow, and the outer ends of the beams 144 are connected by a spacer and bracing rod 150. It will be noted that this provides a simple and convenient mechanism for raising and lowering the snow remover without blocking in any manner the front of the radiator of the truck. This is a special advantage since when such trucks are in operation there is danger that the engine will become overheated if the radiator is blocked.

The hydraulic cylinders 136 are supplied with fluid under pressure through flexible pipes 152, releasable connections 154 and pipes 156. Pipes 156 are connected to a valve chest 158 in which is a valve controlled by linkage system 160 through a handle 162 located in the cab of the truck. The details of this valve form no part of the invention, and it is sufficient to state that when the valve is moved to one position the piston will be caused to rise, while in the other position it will drop. Fluid under pressure is supplied to the valve chest 158 from the tank 28.

In order to take the load off of this hydraulic system when the truck is being driven over long distances and the snow remover is not in use, I may provide pins 161 adapted to pass through holes in the T rails 114 just below the blocks 118 when the same are in raised position. These pins may be secured to the T rails by chains 163 so that they will not be lost. Preferably the pins have pointed ends and annular grooves 164 at points spaced from the ends, so that the pressure caused by the weight of the plow exerted through engagement of blocks 118 with the ends of the pin will cause the grooves 164 to engage the sides of the openings in the rails 114 and thus prevent the pins from slipping out of position even though subjected to the shocks caused by inequalities in the road.

Additional mechanism is provided to make certain that one side of the plow does not rise faster than the other, and to insure leveling of the snow remover at all times. Brackets 166 secured to the upper ends of the T-shaped rails 114 support a shaft 168 which extends across the front of the snow remover. At each side of the snow remover are arranged levers 170 both keyed to the shaft. Links 172 are each pivoted at one end to one of said levers 170 and at the other ends engage the pins 122. This arrangement prevents one side of the plow from moving faster or slower than the other, since any motion imparted to one side will be equalized on the other side through the links, levers and shaft. It will be noted that when the plow is in its raised position, shown in Fig. 8, the levers 170 are substantially upright, and thus also help to take the load off the hydraulic mechanism.

In order to brace the bottom of the plow against backward tilting because of the pressure of snow, a special type of thrust bar is provided (Figs. 13 and 14). A plate 174 is bolted or otherwise suitably secured to the chassis frame. This plate has a transverse wall 176 in which is threaded a lockable bolt 178. The plate is also provided with two horizontal slots 180. A bracing arm 182 extending diagonally downward from the plate has its end bent over into a parallel position, and carries a cross plate or stop 184 at its end to be engaged by the screw 178. Two bolts 186 are arranged at the end of the bar 182 and pass through the slot 180. By this arrangement the position of the brace may be adjusted longitudinally of the truck, and it may be locked in any adjusted position.

A tension member 188 is pivoted on one of the longitudinal chassis frame members and extends substantially vertically downwardly. The lower end is connected by a pin 190 to the end of the brace 182. Also pivoted on the same pin is a thrust bar 192 consisting of an I beam. The front end of this thrust bar is secured by a pin 194 to the lower corner of the plow supporting frame. Obviously one of these bars is arranged on each side of the snow remover, and the bracing members 182 are connected by a cross member 175 extending beneath the truck.

Fig. 27 shows a modified form of push bar, in which the brace 177 is bent, and a second tension member 179 pivoted to the chassis member 2 and to an intermediate point of the brace is provided.

The fan casing 46 is mounted to rotate for example in the manner shown in the Wandscheer Patent No. 1,886,069. It is important to be able to shift the position of the spout 48 from one side to the other of the snow remover so that the direction of the stream of snow may be changed. For this purpose, I provide a hydraulic device for controlling the position of the fan casing. A lever 196 in the cab of the truck through a lever and linkage system 198 controls a valve in a valve box 200, supplied with fluid under pressure from the reservoir 26. Pipes 202 extend from this reservoir to the front of the truck and are connected through couplings 204 to flexible hoses 206.

Mounted on the cross member 94 is a bracket 208 which carries a pin 210 supporting one end of a hydraulic cylinder 212. The member 94 also supports a pair of spaced U-shaped rails 214 between which slides a cross head 216. A piston slidable in the cylinder 212 has an extension 218 which is connected by a pin 220 to the cross head 216. A pin 222 carried by the cross head 216 forms a pivot for one end of a link 224 which at its other end engages a pivot pin 226 fixed in the rear wall of the fan casing. Pipes 206 on opposite sides of the plow are connected respectively to pipes 228 and 230 opening into opposite ends of the cylinder 212. It is evident that by admitting fluid under pressure to one side or the other of the piston the cross head 216 will be caused to move and will shift the spout 48 from one side to the other.

In order to support the plow at a slight distance above the road when it is in use, without carrying the load of the plow by the hydraulic lifting mechanism, I may provide a shoe 232 (see Fig. 25) on each side of the plow mounted on a lever 234 pivoted at 235 on member 98 and controlled in its position by a bolt 236 extending through the rear frame member 96 and adjustable in its longitudinal position by nuts 238.

While I have described herein some embodiments of my invention, I wish it to be understood that I do not intend to limit myself thereby except within the scope of the appended claims.

What I claim is:

1. In a snow remover comprising a vehicle having a frame, a snow removing mechanism mounted forwardly of the vehicle and a power unit mounted at the rear of the vehicle, means connecting said power unit to said snow removing mechanism to drive the same, said means comprising a shaft extending beneath the frame of the vehicle, supporting structure for said vehicle comprising an axle and springs supporting the frame on said axle, and a bearing for said shaft mounted on said supporting structure so as to follow substantially the vertical movements of the axle.

2. In a snow remover comprising a vehicle having a frame, a snow removing mechanism mounted forwardly of the vehicle and a power unit mounted at the rear of the vehicle, means connecting said power unit to said snow removing mechanism to drive the same, said means comprising a shaft extending beneath the frame of the vehicle, supporting structure for said vehicle comprising an axle and springs supporting the frame on said axle, and a self-aligning bearing for said shaft mounted on said supporting structure so as to follow substantially the vertical movements of the axle.

3. In a snow remover comprising a vehicle having a frame, a snow removing mechanism mounted forwardly of the vehicle and a power unit mounted at the rear of the vehicle, means connecting said power unit to said snow removing mechanism to drive the same, said means comprising a shaft extending beneath the frame of the vehicle, supporting structure for said vehicle comprising an axle and springs supporting the frame on said axle, and a flexible bearing for said shaft mounted on said supporting structure so as to follow substantially the vertical movements of the axle.

4. In a snow remover comprising a vehicle having a frame, a snow removing mechanism mounted forwardly of the vehicle and a power unit mounted at the rear of the vehicle, means connecting said power unit to said snow removing mechanism to drive the same, said means comprising a shaft extending beneath the frame of the vehicle, said vehicle having an axle and springs for connecting the axle to the body of the vehicle, and a bearing for said shaft mounted on said axle for movement therewith.

5. In a snow remover comprising a vehicle having a frame, a snow removing mechanism mounted forwardly of the vehicle and a power unit mounted at the rear of the vehicle, means connecting said power unit to said snow removing mechanism to drive the same, said means comprising a shaft extending beneath the frame of the vehicle, said vehicle having an axle and springs for connecting the axle to the body of the vehicle, and a bearing for said shaft mounted on said springs for movement therewith.

6. In a snow remover, a vehicle having a frame, supporting structure for said vehicle comprising an axle and springs supporting the frame on said axle, a snow removing mechanism mounted forwardly of the vehicle, a power unit mounted at the rear of the vehicle, a shaft driven by said power unit, a member mounted on said power unit to swing with respect thereto, a shaft connected to said snow removing mechanism for driving the same and extending rearwardly therefrom beneath the frame of the vehicle, said second shaft being journalled in said member, a bearing for said second shaft mounted on said supporting structure so as to follow substantially the vertical movements of the axle, and means movable with said member for operatively connecting said shafts, whereby said first shaft may drive said second shaft in various adjusted positions of the rear end of said second shaft laterally of the vehicle.

7. A snow removing mechanism comprising a truck having a chassis frame, a power unit, means removably securing said power unit on the rear of said truck, a snow remover, means removably supporting said snow remover on the front of said truck, said truck having a motor, supporting structure for said truck comprising axles and springs supporting the frame on said axles, and road wheels on said axles, at least some of said road wheels being driven by said motor, a shaft driven by said power unit, a shaft connected at its forward end to said snow remover for driving the same and extending rearwardly beneath the chassis frame of the truck, a bearing for said shaft mounted on said supporting structure so as to follow substantially the vertical movements of the front axle, and means adjustable laterally of the truck for operatively connecting said shafts whereby said second shaft may be driven by said first shaft in various positions laterally of the truck.

8. A snow removing mechanism comprising a truck having a chassis frame, a power unit, means removably securing said power unit on the rear of said truck, a snow remover, means removably supporting said snow remover on the front of said truck, said truck having a driving seat, a motor, supporting structure for said truck comprising axles and springs supporting the frame on said axles, road wheels on said axles, some of said road wheels being driven by said motor, a shaft, a clutch connecting said shaft to said power unit, means adjacent the driver's seat for controlling said clutch, a shaft connected at its forward end to said snow remover for driving the same and extending rearwardly beneath the chassis frame of the truck, a bearing for said shaft mounted on said supporting structure so as to follow substantially the vertical movements of the front axle, and means adjustable laterally of the vehicle for operatively connecting said shafts whereby said second shaft may be driven by said first shaft in various positions laterally of the truck.

9. In a snow remover, a truck having a chassis frame, a snow remover mounted on said truck, a power unit mounted on the truck above said chassis frame, a shaft connected to said snow remover and extending beneath the chassis frame of the truck, a second shaft located beneath the chassis frame of the truck, a universal joint connecting the adjacent ends of said shafts, a truck, supporting structure for said truck comprising an axle and springs supporting the frame on said axle, a bearing mounted on said supporting structure so as to follow substantially the vertical movements of the axle, said second shaft extending through and being mounted in said bearing, and means for operatively connecting said second shaft and said power unit.

10. In a snow remover, a truck having a chassis frame, a snow remover mounted on the front of said truck, a power unit mounted on the rear of said truck above said chassis frame, a shaft connected to said snow remover and extending rearwardly therefrom beneath the chassis frame of the truck, a second shaft located beneath the chassis frame of the truck rearwardly of said first shaft, a universal joint connecting the adjacent ends of said shafts, supporting structure for said truck comprising an axle and springs supporting the frame on said axle, and a self-aligning bearing for said shaft mounted on said supporting structure so as to follow substantially the vertical movements of the axle, said second shaft extending through and being mounted in said bearing, and means for operatively connecting said second shaft and said power unit.

11. In a snow remover, a truck having a chassis frame, a snow remover mounted on the front of said truck, a power unit mounted on the rear of said truck above said chassis frame, a shaft connected to said snow remover and extending rearwardly therefrom beneath the chassis frame of the truck, a second shaft located beneath the chassis frame of the truck rearwardly of said first shaft, a universal joint connecting the adjacent ends of said shafts, supporting structure for said truck comprising an axle and springs supporting the frame on said axle, and a bearing mounted on said supporting structure so as to follow substantially the vertical movements of the axle, said second shaft extending through and being mounted in said bearing, a third shaft at the rear of said second shaft located below the chassis frame of the truck, a universal joint connecting the adjacent ends of said second and third shafts, and means for operatively connecting said third shaft and said power unit.

12. In a snow remover, a truck having a chassis frame, a snow remover mounted on the front of said truck, a power unit mounted on the rear of said truck above said chassis frame, a shaft connected to said snow remover and extending rearwardly therefrom beneath the chassis frame of the truck, a universal joint connecting said shaft to said snow remover, a second shaft located beneath the chassis frame of the truck rearwardly of said first shaft, a universal joint connecting the adjacent ends of said shafts, supporting structure for said truck comprising an axle and springs supporting the frame on said axle, and a bearing mounted on said supporting structure so as to follow substantially the vertical movements of the axle, said second shaft extending through and being mounted in said bearing, a third shaft at the rear of said second shaft located below the chassis frame of the truck, a universal joint connecting the adjacent ends of said second and third shafts, and means for operatively connecting said third shaft and said power unit.

13. In a snow remover, a truck having a chassis frame, a snow remover mounted on the front of said truck, a power unit mounted on the rear of said truck above said chassis frame, a shaft connected to said snow remover and extending rearwardly therefrom beneath the chassis frame of the truck, a universal joint connecting said shaft to said snow remover, a second shaft located beneath the chassis frame of the truck rearwardly of said first shaft, a universal joint connecting the adjacent ends of said shafts, supporting structure for said truck comprising an axle and springs supporting the frame on said axle, and a self-aligning bearing mounted on said supporting structure so as to follow substantially the vertical movements of the axle, said second shaft extending through and being mounted in said bearing, a third shaft at the rear of said second shaft located below the chassis frame of the truck, a universal joint connecting the adjacent ends of said second and third shafts, and means adjustable laterally of the truck for operatively connecting said third shaft and said power unit, said last means extending through the chassis frame.

14. In a snow remover comprising a vehicle having a frame, a snow removing mechanism at the front of the vehicle and a power unit mounted at the rear of the vehicle, means mounting said snow remover on the vehicle for vertical movement with respect thereto, means connecting said power unit to said snow removing mechanism to drive the same, said means comprising a shaft extending beneath the frame of the vehicle, supporting structure for said vehicle comprising an axle and springs supporting the frame on said axle, and a bearing for said shaft mounted on said supporting structure so as to follow substantially the vertical movements of the axle.

15. In a snow remover comprising a vehicle having a frame, a snow removing mechanism at the front of the vehicle and a power unit mounted at the rear of the vehicle, means mounting said snow remover on the vehicle for vertical movement with respect thereto, means mounted on the vehicle for raising and lowering the snow remover with respect thereto, means connecting said power unit to said snow removing mechanism to drive the same, said means comprising a shaft extending beneath the frame of the vehicle, supporting structure for said vehicle comprising an axle and springs supporting the frame on said axle, and a bearing for said shaft mounted on said supporting structure so as to follow substantially the vertical movements of the axle.

16. In a snow remover comprising a vehicle having a chassis frame, a snow remover, means mounting said snow remover on the vehicle for vertical movement with respect thereto, a power unit mounted on the vehicle, a shaft connected to said snow remover, a second shaft located beneath the chassis frame of the vehicle, a universal joint connecting the adjacent ends of said shafts, supporting structure for said vehicle comprising an axle and springs supporting the frame on said axle, a bearing mounted on said supporting structure so as to follow substantially the vertical movements of the axle, said second shaft extending through and being mounted in said bearing, and means for operatively connecting said second shaft and said power unit.

17. In a snow remover, a vehicle having a frame, a snow removing mechanism mounted forwardly of the vehicle, a power unit mounted at the rear of the vehicle, a shaft driven by said power unit mounted therein to rotate about a horizontal axis, a connecting member, means mounting said member on said power unit to swing with respect thereto about said shaft as an axis, a shaft connected to said snow removing mechanism for driving the same and extending rearwardly therefrom beneath the frame of the vehicle, said second shaft being journalled in said connecting member, means movable with said member for operatively connecting said shafts, whereby said first shaft may drive said second shaft in various adjusted positions of the rear end of said second shaft laterally of the vehicle, and means to secure said member to said vehicle to hold the same in adjusted position.

18. In a snow remover, a vehicle having a frame, a snow removing mechanism mounted forwardly of the vehicle, a power unit mounted at the rear of the vehicle, a shaft driven by said power unit mounted therein to rotate about a horizontal axis, a casing, means mounting said casing on said power unit to swing with respect thereto about said shaft as an axis, a shaft connected to said snow removing mechanism for driving the same and extending rearwardly therefrom beneath the frame of the vehicle, said second shaft being journalled in said casing, means in said casing for operatively connecting said shafts, whereby said first shaft may drive said second shaft in various adjusted positions of the rear end of said second shaft laterally of the vehicle, and means to secure said casing to said vehicle to hold the same in adjusted position.

19. In a device as claimed in claim 18, said means for operatively connecting said shafts comprising sprockets on said shafts within said casing and a chain connecting said sprockets.

20. In a device as claimed in claim 18, said means operatively connecting said shafts comprising gears on said shafts within said casing, a third shaft mounted in said casing and extending longitudinally thereof, and gears on said third shaft meshing with said first named gears.

WALTER E. KLAUER.